(12) United States Patent
Okui

(10) Patent No.: US 9,214,815 B2
(45) Date of Patent: Dec. 15, 2015

(54) POWER SUPPLY SYSTEM INCLUDING A BATTERY, A DC/DC CONVERTER, AND AN INVERTER

(75) Inventor: Yoshiaki Okui, Toshima-ku (JP)

(73) Assignee: SANYO DENKI CO., LTD., Toshima-Ku, Tokyo (JP)

( * ) Notice: Subject to any disclaimer, the term of this patent is extended or adjusted under 35 U.S.C. 154(b) by 761 days.

(21) Appl. No.: 13/543,214

(22) Filed: Jul. 6, 2012

(65) Prior Publication Data

US 2013/0009482 A1 Jan. 10, 2013

(30) Foreign Application Priority Data

Jul. 8, 2011 (JP) .................. 2011-152349

(51) Int. Cl.
*H02J 3/32* (2006.01)
*H02J 3/24* (2006.01)

(52) U.S. Cl.
CPC ... *H02J 3/32* (2013.01); *H02J 3/24* (2013.01); *Y10T 307/625* (2015.04)

(58) Field of Classification Search
CPC ..................... H02J 3/32; H02J 3/24
USPC .......................................................... 307/66
See application file for complete search history.

(56) References Cited

U.S. PATENT DOCUMENTS

| 4,437,050 A | 3/1984 | Overzet |
| 5,329,222 A | 7/1994 | Gyugyi et al. |
| 7,855,906 B2 * | 12/2010 | Klodowski et al. ............. 363/97 |
| 2002/0036911 A1 | 3/2002 | Okui |
| 2010/0133904 A1 | 6/2010 | Klodowski et al. |
| 2011/0068628 A1 | 3/2011 | Kondo et al. |

FOREIGN PATENT DOCUMENTS

| GB | 2 136 168 A | 9/1984 |
| JP | 2002-101575 A | 4/2002 |

OTHER PUBLICATIONS

Virulkar, V. and Aware, M., "Analysis of DSTATCOM with BESS for Mitigation of Flicker" 2009, IEEE, Control, Automation, Communication and Energy Conservation, 2009. INCACEC 2009. 2009 International Conference on, pp. 1-7.*

Sun, J.; Czarkowski, D.; and Zabar, Z.; "Voltage Flicker Mitigation Using PWM-Based Distribution STATCOM" 2002, IEEE, Power Engineering Society Summer Meeting 2002 IEEE vol. 1, pp. 616-621.*

(Continued)

*Primary Examiner* — Thienvu Tran
*Assistant Examiner* — Brett Squires
(74) *Attorney, Agent, or Firm* — Buchanan Ingersoll & Rooney PC

(57) ABSTRACT

A power supply system includes an inverter controller which amplifies a deviation between a bus voltage command signal and a bus voltage signal obtained by detecting a bus voltage, inputs the amplified deviation to a first limit unit for limiting output power of a commercial power supply, divides the deviation into a first deviation within a first limit value of the first limit unit and a second deviation which exceeds a range of the first limit value, and controls an inverter on the basis of the first deviation, and a DC/DC converter controller which controls a DC/DC converter on the basis of the second deviation.

5 Claims, 3 Drawing Sheets

(56) References Cited

OTHER PUBLICATIONS

Jul. 20, 2015 European Extended Search Report issued by European Patent Office in European Application No. 12175066.5.
Yonghua Cheng, et al. "Using Super Capacitor Based Energy Storage to Improve Power Quality in Distributed Power Generation," Power Electronics and Motion Control Conference, 2006. EPE-PEMC 2006. 12th International, IEEE, Piscataway, NJ, USA Aug. 30, 2006, pp. 537-543, XP031421673, DOI: 10.1109/EPEPEMC.2006.4778455 ISBN: 978-1-4244-0121-5.

* cited by examiner

POWER SUPPLY SYSTEM INCLUDING A BATTERY, A DC/DC CONVERTER, AND AN INVERTER

CROSS-REFERENCE TO RELATED APPLICATION

This application is based on Japanese Patent Application No. 2011-152349 filed on Jul. 8, 2011, the contents of which are incorporated herein by reference.

BACKGROUND

1. Technical Field

The present invention relates to a power supply system.

2. Description of Related Art

A large-sized press apparatus and conveyance facilities require instantaneous large power. Therefore, a large current flows in a temporary overload state and a voltage drop occurs, whereby respective facilities are affected, which is a problem known as voltage flicker.

In a conventional technique described in Unexamined Japanese Patent Publication No. 2002-101575, power supplied from an inverter is controlled by an active filter to cause alternating current input power supplied from the commercial power supply to become a predetermined power.

In the conventional technique, however, control of the inverter is separated from control of a DC/DC converter. Depending on magnitude of an output voltage supplied from the commercial power supply, it is difficult to conduct input limiting and to cope with the problem of the voltage flicker.

SUMMARY

The present invention has been made in order to solve such a problem. An object of the present invention is to limit a deviation between a bus voltage command value of the inverter and a detected bus voltage and cause an input current from a commercial power supply to follow an input current command value generated based on the limited deviation, and thereby limit the input current. As a result, peak cutting of the input current from the commercial power supply is made possible without depending on the output voltage of the commercial power supply.

The object of the present invention is achieved by the following means:

A power supply system including a commercial power supply, a load which generates power and consumes power, a battery which can be charged/discharged, a DC/DC converter which boosts an output voltage of the battery to generate a bus voltage and charges/discharges the battery by using power supplied to the bus voltage, an inverter which rectifies AC power and supplies the power as DC power to said bus voltage when charging said battery by receiving/giving from/to said bus voltage the AC power obtained by subtracting power of said load from power of said commercial power supply limited in output, and converts the DC power of the bus voltage to AC power and supplies the power to the load when discharging the battery, an inverter controller which amplifies a deviation between a bus voltage command signal defining a command value of the bus voltage and a bus voltage signal obtained by detecting the bus voltage, inputs the amplified deviation to a first limit unit for limiting output power of the commercial power supply, divides the amplified deviation to a first deviation within a first limit value of the first limit unit and a second deviation exceeding a range of the first limit value, and controls the inverter based on the first deviation, and a DC/DC converter controller which controls the DC/DC converter based on the second deviation.

The objects, features, and characteristics of this invention other than those set forth above will become apparent from the description given herein below with reference to preferred embodiments illustrated in the accompanying drawings.

DETAILED DESCRIPTION

Hereafter, a power supply system according to an embodiment of the present invention will be described in detail with reference to the drawings. Meanwhile, in the present specification, the concept of the term "amplification" is to include the case where the amplification factor is 1 or less.

Figure 1:
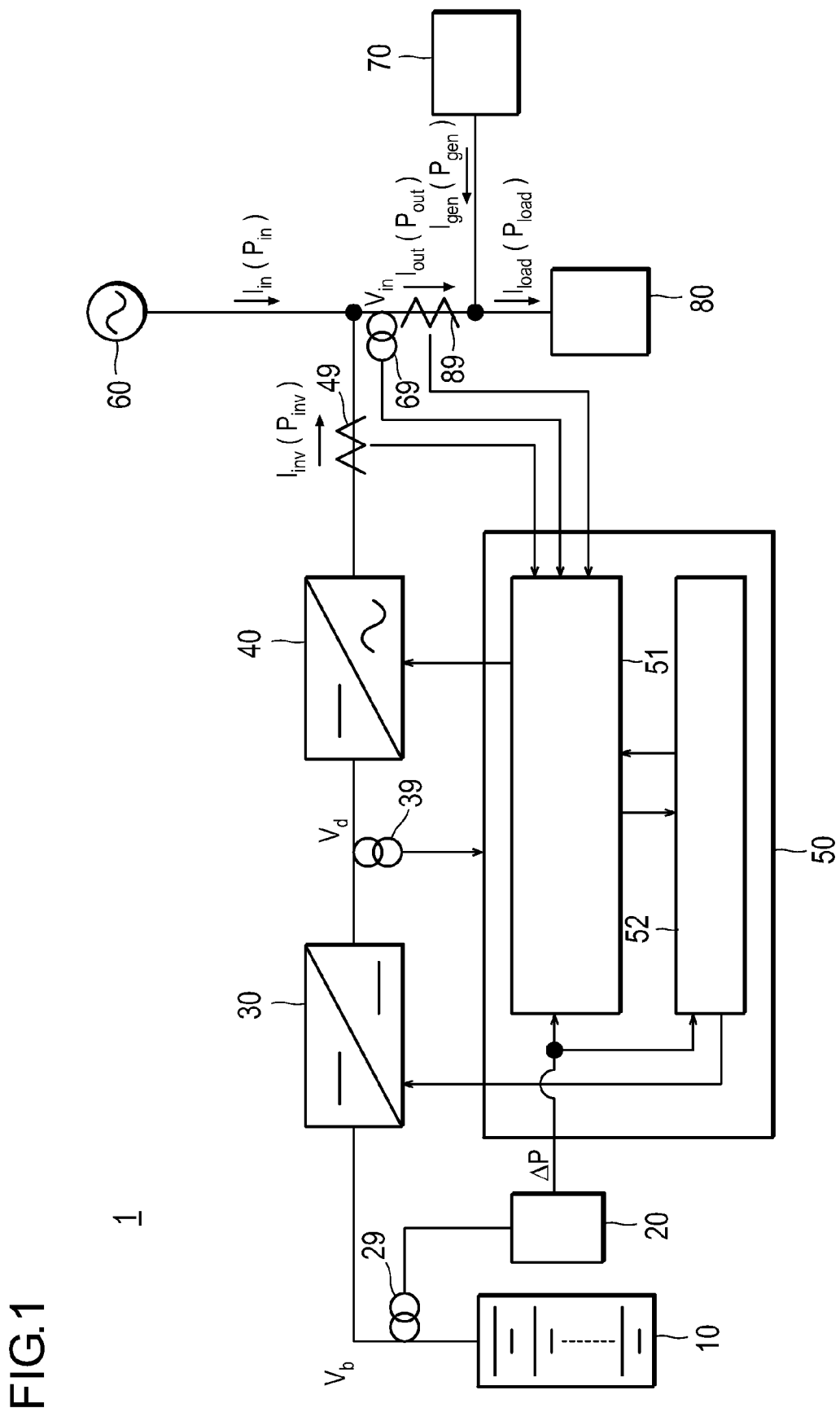
FIG. 1 is a functional block diagram of a power supply system according to an embodiment of the present invention.

FIG. 1 is a functional block diagram of a power supply system according to an embodiment of the present invention.

The power supply system 1 according to the present embodiment includes a battery 10, a DC/DC converter 30, a charging/discharging power limit controller 20, an inverter 40, a controller 50, a commercial power supply 60, a power generating apparatus 70, a load apparatus (load) 80, a battery voltage sensor 29, a bus voltage sensor 39, an input voltage sensor 69, an inverter current sensor 49, and an output current sensor 89.

The controller 50 includes an inverter controller 51 and a DC/DC converter controller 52.

The battery 10 may be a secondary battery such as a lead battery or a lithium ion battery. However, the battery 10 is not restricted to it but may be an EDLC (Electric Double Layer Capacitor). In general, these devices have internal impedance.

The charging/discharging power limit controller 20 generates a charging/discharging power limit control signal $\Delta P$ based on a deviation between an output voltage (hereafter referred to as "battery voltage") $V_b$ of the battery 10 detected by the battery voltage sensor 29 and an output voltage command value.

If the battery voltage $V_b$ detected by the battery voltage sensor 29 exceeds either a lower limit value $V_{bL}$ or an upper limit value $V_{bH}$, then the charging/discharging power limit controller 20 limits the detected battery voltage $V_b$ to either the lower limit value $V_{bL}$ or the upper limit value $V_{bH}$. And the limited battery voltage $V_b$ (i.e., either the lower limit value $V_{bL}$ or the upper limit value $V_{bH}$) is set as an output voltage command value $V_b^*$.

On the other hand, if the battery voltage $V_b$ is in a range between the lower limit value $V_{bL}$ and the upper limit value $V_{bH}$, the detected battery voltage $V_b$ can be set as the output voltage command value $V_b^*$.

The charging/discharging power limit control signal $\Delta P$ generated by the charging/discharging power limit controller 20 is output to the controller 50.

The controller 50 performs PWM (Pulse Width Modulation) control on the DC/DC converter 30 and the inverter 40 to cause a bus voltage $V_d$ to follow a bus voltage command value $V_d^*$. Furthermore, the controller 50 controls the DC/DC converter 30 and the inverter 40 so as to cause the charging/ discharging power limit control signal ΔP which is input from the charging/discharging power limit controller 20 to become small, and thereby causes the output voltage $V_b$ to follow the output voltage command value $V_b{}^*$. The bus voltage command value $V_d{}^*$ may be input from an external source or may be previously stored in an unillustrated storage device.

The controller 50 limits the input current $I_{in}$ by limiting a deviation between the bus voltage command value $V_d{}^*$ and the bus voltage $V_d$ and by controlling an input current $I_{in}$ using an input current command signal $I_{in}{}^*$ which is generated based on the limited deviation. As a result, it becomes possible to conduct the peak cutting on the input current $I_{in}$ without depending on the output voltage (AC voltage) $V_{in}$ from the commercial power supply. Accordingly, it becomes possible to improve the versatility of the power supply system 1 and suppress the scale of the power receiving facilities of the commercial power supply 60 and thereby achieve the reduction of the apparatus cost.

Furthermore, the controller 50 can be equipped with an active filter function. By providing the controller 50 with the active filter function, it becomes possible to reduce the impedance loss of input power $P_{in}$ caused by reactive power.

The DC/DC converter 30 supplies a discharging current from the battery 10 to the bus voltage $V_d$. This operation of the DC/DC converter 30 is equivalent to boosting the output voltage $V_b$ of the battery 10 and outputting a resultant voltage as the bus voltage $V_d$. Furthermore, the DC/DC converter 30 supplies a current supplied to the bus voltage $V_d$ to the battery 10. This operation of the DC/DC converter 30 is equivalent to performing a step-down operation on the bus voltage $V_d$. The DC/DC converter 30 keeps the voltage value of the bus voltage $V_d$ constant by charging and discharging the battery 10 based on a control signal supplied from the controller 50.

The inverter 40 converts the bus voltage $V_d$ to an AC voltage under the PWM control performed by the controller 50 and outputs the AC voltage. In addition, the inverter 40 rectifies an inverter current $I_{inv}$ which is an AC current and supplies a resultant current to the bus voltage $V_d$. In this way, the inverter 40 conducts the boosting and step-down operations on the bus voltage $V_d$.

Therefore, the bus voltage $V_d$ is controlled by the discharging current supplied from the battery 10 to the bus voltage $V_d$ by the DC/DC converter 30 and the inverter current $I_{inv}$ supplied to the bus voltage $V_d$ by the inverter 40. In other words, the bus voltage $V_d$ follows the bus voltage command value $V_d{}^*$ and is retained, because the DC/DC converter 30 and the inverter 40 are controlled by the controller 50.

Here, the inverter current $I_{inv}$ is an AC current obtained by subtracting the sum of a current output out of the power generating apparatus 70 and a current input to the load apparatus 80 from the input current $I_{in}$ supplied from the commercial power supply 60.

The battery voltage sensor 29, the bus voltage sensor 39, and the input voltage sensor 69 can be constituted by using any known voltmeter.

The inverter current sensor 49 and the output current sensor 89 can be constituted by using, for example, a current transformer.

The commercial power supply 60 is facilities for supplying power from an electric power company to power consumers. The power generating apparatus 70 is an independent power generating apparatus which does not depend upon the commercial power supply, and it may include any power generating apparatus such as a solar power generating apparatus or a wind power generating apparatus.

The load apparatus 80 is an apparatus driven by an AC voltage and is not restricted as long as it consumes power.

Figure 2:
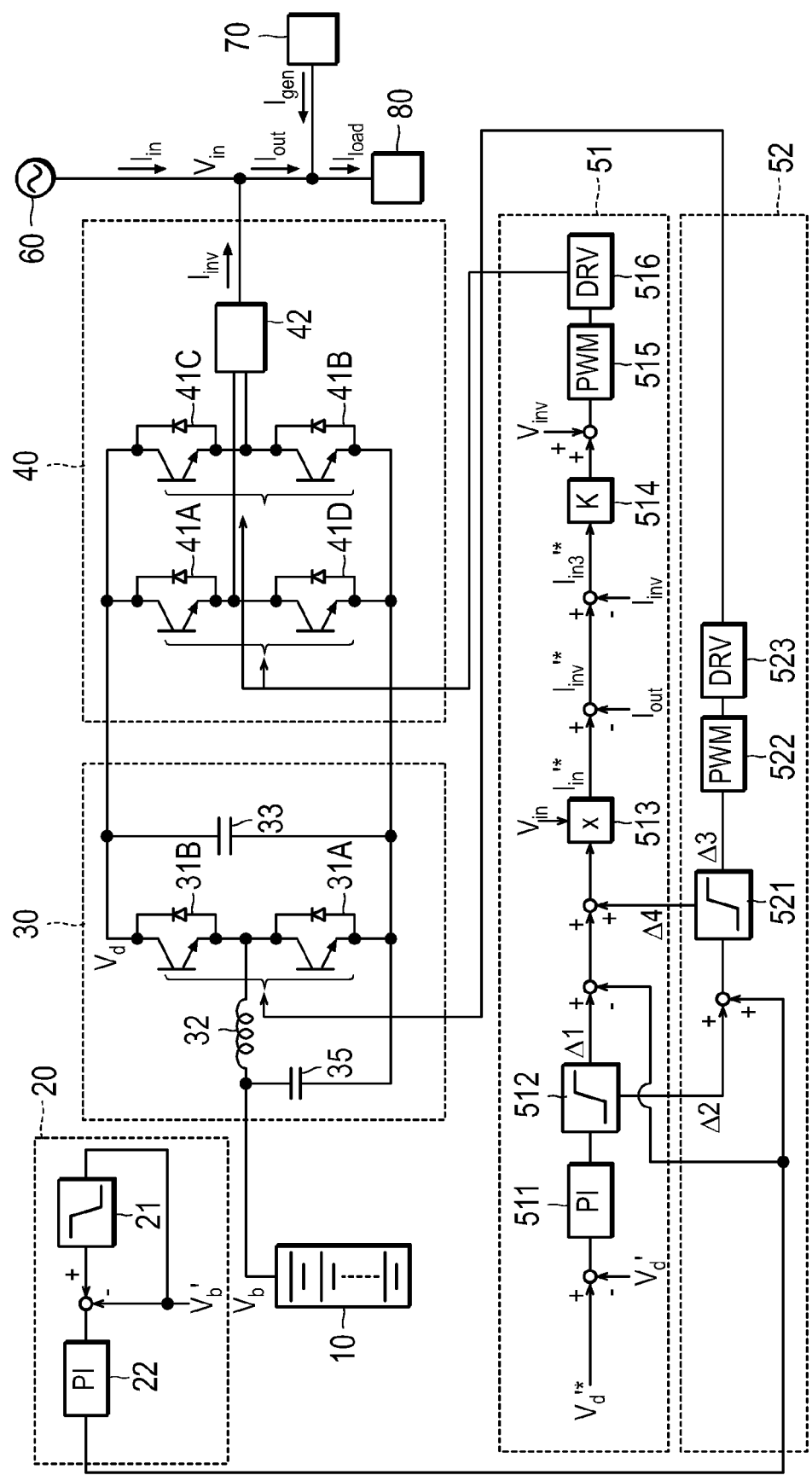
FIG. 2 is a schematic circuit diagram of the power supply system according to the embodiment of the present invention.

FIG. 2 is a schematic circuit diagram of the power supply system according to the embodiment of the present invention. The functions of respective function blocks in the function block diagram shown in FIG. 1 can be implemented by a circuit shown in FIG. 2.

Meanwhile, in FIG. 2, a voltage detection apparatus such as the battery voltage sensor 29 and a current detection apparatus such as an inverter current sensor 49 are omitted for brevity.

Furthermore, in the present embodiment, functions of the charging/discharging power limit controller 20, the DC/DC converter controller 52, and the inverter controller 51, with the exception of drive units 516 and 523, are executed by operation processing using software. Therefore, each of the battery voltage sensor 29, the bus voltage sensor 39, the input voltage sensor 69, the inverter current sensor 49, and the output current sensor 89 detects a voltage or a current as a signal which can be subject to operation processing using software. For example, these sensors can detect a voltage as a signal by attenuating a detected voltage using a voltage divider and converting this voltage to a digital signal using an A/D converter. In the ensuing description, for example, the detected output voltage signal in the case where the output voltage "$V_b$" of the battery is detected by the battery voltage sensor 29 will be denoted by "$V_b{}'$."

As for the functions of the charging/discharging power limit controller 20, the DC/DC converter controller 52, and the inverter controller 51, however, it is a matter of course that a part or the whole of the functions may be implemented by using only hardware (for example, an electronic circuit).

In description of FIG. 2, the descriptions already made with reference to FIG. 1 will be omitted to avoid duplicated description.

The DC/DC converter 30 can be constituted from an ordinary boosting chopper circuit which is composed of inductance 32, a capacitor 35, IGBTs (Insulated Gate Bipolar Transistors) 31A and 31B, and a capacitor 33.

Operation of the DC/DC converter 30 will be described briefly.

If one IGBT 31A is brought into a conduction state and the other IGBT 31B is brought into a non-conduction state, then a current flowing from the battery 10 to the IGBT 31A is applied to the inductance 32. If from this state one IGBT 31A is changed over to a non-conduction state and the other IGBT 31B is changed over to a conduction state, then energy stored in the inductance 32 is released. As a result, electric charge is charged to the capacitor 33 from one terminal of the inductance 32 whose the other terminal the output voltage $V_b$ was applied to. Therefore, the value of the bus voltage $V_d$ increases. In other words, the DC/DC converter 30 functions as a booster.

On the other hand, the electric charge charged across the capacitor 33 flows into the battery as a current via the IGBT 31B brought into the conduction state, and consequently the battery 10 can be charged. At this time, the value of the bus voltage $V_d$ decreases, and the output voltage $V_b$ of the battery increases. In other words, the DC/DC converter 30 functions as a step-down apparatus as well.

The inverter 40 can be constituted from an ordinary inverter circuit composed of four IGBPs 41A, 41B, 41C and 41D, and a filter 42.

PWM control signals of the same phase are input to the bases of a pair of IGBPs 41A and 41B as well as a pair of IGBPs 41C and 41D among the four IGBPs 41A, 41B, 41C and 41D. In other words, if the pair of the IGBPs 41A and 41B is in the conduction state, the pair of IGBPs 41C and 41D is in the non-conduction state. If the pair of the IGBPs 41A and 41B is in the non-conduction state, the pair of IGBPs 41C and 41D is in the conduction state.

The inverter 40 is controlled by an inverter control signals supplied from the inverter controller 51 to bring each of the four IGBPs 41A, 41B, 41C and 41D into the conduction state or the non-conduction state. A voltage rectangular wave obtained by the PWM control using the inverter control signal is converted to an average voltage via the filter 42 and output as a pseudo sine wave AC voltage.

On the other hand, the inverter 40 can charge or discharge the capacitor 33 by using the inverter current via the IGBPs 41A and 41B or IGBPs 41C and 41D which were brought into the conduction state, and thereby control the bus voltage $V_d$. In other words, the inverter 40 can function as a booster or a step-down apparatus.

The filter 42 can be constituted by using an LPF (Low Pass Filter) including inductances and capacitances as constituents.

The inverter controller 51 controls the inverter 40 to cause a detected bus voltage signal $V_d'$ to follow a bus voltage command signal $V_d'^*$, cause an inverter current signal $I_{inv}'$ to follow an inverter current command signal (a second current command signal) $I_{inv}'^*$, and cause an output voltage of the inverter 40 to follow an output voltage signal (AC voltage signal) $V_{in}'$ supplied from the commercial power supply 60.

In the inverter controller 51, the following processing is conducted. A deviation between the bus voltage command signal $V_d'^*$ and the detected bus voltage signal $V_d'$ is subject to proportional integral (amplification) in a PI control unit 511, and a result is output to a first limit unit 512. The deviation between the bus voltage command signal $V_d'^*$ and the detected bus voltage signal $V_d'$ subjected to proportional integral is divided by the first limit unit 512 into a first deviation $\Delta 1$ within a limit value and a second deviation $\Delta 2$ which exceeds the limit value. The charging/discharging power limit control signal $\Delta P$ is subtracted from the first deviation $\Delta 1$. A fourth deviation $\Delta 4$ which is input from the DC/DC converter controller 52 is added to a resultant difference. Then, a resultant sum is multiplied in a multiplication unit 513 by the input voltage signal $V_{in}'$ with the amplitude set equal to 1. As a result, an input current command signal (a first current command signal) $I_{in}'^*$ having the same phase as that of the input voltage signal $V_{in}'$ is output from the multiplication unit 513. Here, since the input current command signal $I_{in}'^*$ has the same phase as that of the input voltage signal $V_{in}'$, the input current command signal $I_{in}'^*$ is a current command signal having only an active current component, and it becomes a command signal for an input current signal $I_{in}'$.

An output current signal $I_{out}'$ is subtracted from the input current command signal $I_{in}'^*$, and consequently the inverter current command signal $I_{inv}'^*$ is generated. Since the inverter current command signal $I_{inv}'^*$ is generated by subtracting the output current signal $I_{out}'$ from the input current command signal $I_{in}'^*$ having only an active current component, the inverter current command signal $I_{inv}'^*$ becomes a current command signal for only a reactive current component in the output current signal $I_{out}'$.

A third current command signal $I_{in3}'^*$ which is a deviation between the inverter current command signal $I_{inv}'^*$ and the inverter current signal $I_{inv}'$ is amplified by an amplification unit 514. Since the third current command signal $I_{in3}'^*$ is amplified by the amplification unit 514, it is possible to increase an open loop gain of the inverter controller 51 and render the inverter current signal $I_{inv}'$ coincide with the inverter current command signal $I_{inv}'^*$ in a closed loop with high precision. As a result, it is possible to render the input current signal $I_{in}'$ coincide with the input current command signal $I_{in}'^*$ with high precision.

The detected input voltage signal $V_{in}'$ is added to the third current command signal $I_{in3}'^*$ amplified by the amplification unit 514. A PWM control signal generation unit 515 generates the inverter control signal on the basis of the third current command signal $I_{in3}'^*$ with the input voltage signal $V_{in}'$ added.

Here, the amplification unit 514 multiplies a feedback gain K.

The drive unit 516 amplifies a PWM control signal generated by the PWM control signal generation unit 515 until the power capable of driving the inverter 40 is obtained, and outputs a resultant signal to the inverter 40. As a result, the inverter controller 51 controls the inverter 40 to cause the bus voltage signal $V_d'$ to follow the bus voltage command signal $V_d'^*$ cause the inverter current signal $I_{inv}'$ to follow the inverter current command signal $I_{inv}'^*$, and cause the output voltage of the inverter 40 to follow the output voltage signal $V_{in}'$ supplied from the commercial power supply 60.

In this way, in the power supply system according to the present embodiment, the deviation between the bus voltage command signal $V_d'^*$ and the detected bus voltage signal $V_d'$ is limited. And consequently, the input current $I_{in}$ supplied from the commercial power supply 60 is caused to follow the input current command signal $I_{in}'^*$ generated on the basis of the limited first deviation $\Delta 1$, and thereby the input current $I_{in}$ is limited. As a result, the peak cutting of the input current $I_{in}$ supplied from the commercial power supply 60 is made possible without depending upon the output voltage $V_{in}$ of the commercial power supply.

Furthermore, it is not necessary to provide an input power command value for limiting the input power $P_{in}$ supplied from the commercial power supply 60.

In the power supply system 1 according to the present embodiment, therefore, the versatility of the peak cutting function of the power supply system can be enhanced.

Figure 3:
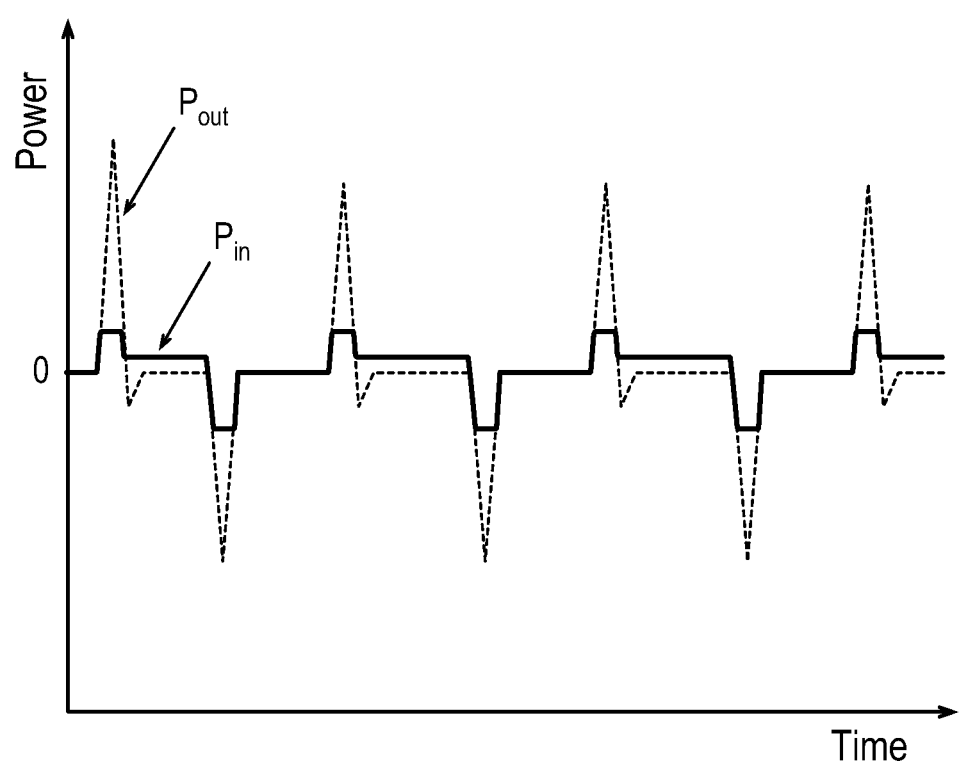
FIG. 3 is an explanation diagram showing power waveforms of input power from a commercial power supply subjected to peak cutting and of output power.

FIG. 3 is an explanation diagram showing power waveforms of input power from the commercial power supply subjected to peak cutting and of output power.

According to the present embodiment, the input current $I_{in}$ supplied from the commercial power supply 60 is limited. Here, when the load apparatus 80 and the power generating apparatus 70 are considered to be one power consuming apparatus, the current $I_{inv}$ which exceeds the input current $I_{in}$ out of an output current $I_{out}$ needed for the power consuming apparatus is supplied from the inverter 40. As shown in FIG. 3, therefore, the input power $P_{in}$ supplied from the commercial power supply 60 is subject to the peak cutting. The peak cutting is conducted both when the consumed power increases momentarily in driving the power consuming apparatus and when negative consumed power (i.e., production power) increases momentarily in regenerating the power consuming apparatus.

The charging/discharging power limit controller 20 can be constituted from a limiter unit 21 and a PI control unit 22.

If the battery voltage $V_b$ detected as the detected output voltage signal $V_b'$ is lower than a lower limit value $V_{bL}'$, then the limiter unit 21 limits it to the lower limit value $V_{bL}'$ and outputs the lower limit value $V_{bL}'$. If the detected output voltage signal $V_b'$ is higher than an upper limit value $V_{bH}'$, then the limiter unit 21 limits it to the upper limit value $V_{bH}'$ and outputs the upper limit value $V_{bH}'$. As a result, a signal which is output from the limiter unit 21 becomes a voltage signal in a range between the lower limit value $V_{bL}'$ and the upper limit value $V_{bH}'$, and it is utilized as the output voltage command signal $V_b'^*$ of the battery 10.

The PI control unit 22 conducts a proportional integral operation (amplification) on a deviation between the detected output voltage signal $V_b'$ and the output voltage command signal $V_b^*$, thereby generates the charging/discharging power limit control signal ΔP which is the output deviation, and outputs the charging/discharging power limit control signal ΔP to the DC/DC converter controller 52 and the inverter controller 51.

The DC/DC converter controller 52 controls the DC/DC converter 30 to cause the bus voltage signal $V_d'$ to follow the bus voltage command signal $V_d'^*$.

In the DC/DC converter controller 52, the following processing is conducted. The charging/discharging power limit control signal ΔP is added to second deviation Δ2 which is output from the inverter controller, and a resultant sum is divided by a second limit unit 521 into a third deviation Δ3 within a limit value and a fourth deviation Δ4 which exceeds the limit value. A PWM control signal generation unit 522 generates a DC/DC converter control signal for PWM control based on the third deviation Δ3. A drive unit 523 amplifies the DC/DC converter control signal generated by the PWM control signal generation unit 522 until power capable of driving the DC/DC converter 30 is obtained, and outputs a resultant signal to the DC/DC converter 30. As a result, the DC/DC converter controller 52 controls the DC/DC converter to cause the detected output voltage signal $V_b'$ to follow the output voltage command signal $V_b'^*$.

In this way, the DC/DC converter controller 52 controls the charging/discharging power for the battery 10 based on the third deviation Δ3 derived from the deviation between the detected output voltage signal $V_b'$ and the output voltage command signal $V_b'^*$. As a result, it is possible to suppress the influence of the internal impedance of the battery 10 and conduct effective use of the inherent charging/discharging power quantity of the battery 10 sufficiently.

Heretofore, the power supply system according to the embodiment of the present invention has been described in detail. In the power supply system according to the embodiment of the present invention, the deviation between the bus voltage command value for the inverter and the detected bus voltage is limited, and the input current supplied from the commercial power supply is caused to follow the input current command value generated based on the limited deviation, and thereby the input current is limited. Furthermore, it is not necessary to provide an input power command value for limiting the input power supplied from the commercial power supply. As a result, the peak cutting of the input current supplied from the commercial power supply is made possible without depending upon the output voltage of the commercial power supply, and the versatility of the peak cutting function of the power supply system can be enhanced.

What is claimed is:

1. A power supply system comprising:
a commercial power supply;
a load which generates power and consumes power;
a battery which can be charged/discharged;
a DC/DC converter which boosts an output voltage of said battery to generate a bus voltage on a bus between said DC/DC converter and an inverter, and charges/discharges said battery by using power supplied to said bus;
the inverter rectifies AC power and supplies the power as DC power to said bus when charging said battery by providing to said bus the AC power obtained by subtracting power of said load from power of said commercial power supply limited in output, and converts said DC power of said bus voltage to AC power and supplies the power to said load when discharging said battery;
an inverter controller which amplifies a deviation between a bus voltage command signal defining a command value of said bus voltage and a bus voltage signal obtained by detecting said bus voltage, inputs the amplified deviation to a first limit unit for limiting output power of said commercial power supply, divides the amplified deviation into a first deviation within a first limit value of the first limit unit and a second deviation exceeding a range of the first limit value, and controls said inverter based on said first deviation; and
a DC/DC converter controller which controls said DC/DC converter based on said second deviation.

2. The power supply system as claimed in claim 1 wherein said inverter controller
generates a first current command signal having the same phase as that of an AC voltage signal based on said first deviation, wherein said AC voltage signal is obtained by detecting an AC voltage which is output by said commercial power supply,
generates, as a second current command signal, a deviation between said first current command signal and an output current signal obtained by subtracting a current signal flowing out of a power generating apparatus from a current signal flowing to said load,
generates a third current command signal by subtracting an inverter current signal obtained by detecting a current flowing to said inverter from said second current command signal, and
controls said inverter based on said third current command signal and an AC voltage signal obtained by detecting said AC voltage to cause said bus voltage to follow said bus voltage command value and cause the inverter current to follow a value of said second current command, and
said DC/DC converter controller controls said DC/DC converter based on said second deviation to cause said bus voltage to follow said bus voltage command value.

3. The power supply system as claimed in claim 2 further comprising:
a charging/discharging limit controller which causes said DC/DC converter controller and said inverter controller to control said DC/DC converter and said inverter, respectively, so as to bring said output voltage of said battery into a determinate range by adding said second deviation to a charging/discharging limit control signal obtained by amplifying the deviation between an output voltage command signal concerning a predetermined output voltage of said battery and a detected output voltage signal obtained by detecting said output voltage of said battery and also by subtracting said charging/discharging limit control signal from said first deviation.

4. The power supply system as claimed in claim 3 wherein said DC/DC converter controller inputs said second deviation to a second limit unit which limits a maximum charging/discharging power of said battery, divides said second deviation into a third deviation within a limit value of said second limit unit and a fourth deviation which exceeds a range of the limit value of said second limit unit, and outputs said fourth deviation to said inverter controller; and
said inverter controller adds said fourth deviation to said first deviation.

5. The power supply system as claimed in claim 1 wherein said DC/DC converter controller and said inverter controller control said DC/DC converter and said inverter respectively by using PWM.

* * * * *